United States Patent
Lee et al.

(10) Patent No.: US 9,832,805 B2
(45) Date of Patent: Nov. 28, 2017

(54) METHOD AND APPARATUS FOR PROHIBITING AUTONOMOUS DENIAL IN WIRELESS COMMUNICATION SYSTEM

(71) Applicant: LG Electronics Inc., Seoul (KR)

(72) Inventors: Youngdae Lee, Seoul (KR); Sungjun Park, Seoul (KR); Seungjune Yi, Seoul (KR); Sunghoon Jung, Seoul (KR); Jaewook Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/439,770

(22) PCT Filed: Nov. 1, 2013

(86) PCT No.: PCT/KR2013/009841
§ 371 (c)(1),
(2) Date: Apr. 30, 2015

(87) PCT Pub. No.: WO2014/069932
PCT Pub. Date: May 8, 2014

(65) Prior Publication Data
US 2015/0296556 A1  Oct. 15, 2015

Related U.S. Application Data

(60) Provisional application No. 61/721,469, filed on Nov. 1, 2012.

(51) Int. Cl.
*H04W 76/02* (2009.01)
*H04W 72/12* (2009.01)
(Continued)

(52) U.S. Cl.
CPC ............ *H04W 76/027* (2013.01); *H04B 1/10* (2013.01); *H04W 24/08* (2013.01); *H04W 72/1215* (2013.01)

(58) Field of Classification Search
None
See application file for complete search history.

(56) References Cited

U.S. PATENT DOCUMENTS

2012/0069766 A1  3/2012  Fu et al.
2012/0170497 A1  7/2012  Zhang et al.
(Continued)

FOREIGN PATENT DOCUMENTS

| CN | 102611527 A | 7/2012 |
|----|---|---|
| WO | 2012040336 A1 | 3/2012 |
| WO | 2012134178 | 10/2012 |

OTHER PUBLICATIONS

New Postcom, "Discussion on the autonomous denial of LTE transmission/reception," 3GPP TSG RAN WG2 Meeting #78, R2-122360, Prague, Czech, May 21-25, 2012, see p. 2, lines 1-13.
(Continued)

*Primary Examiner* — Kouroush Mohebbi
(74) *Attorney, Agent, or Firm* — Dentons US LLP

(57) ABSTRACT

A method and apparatus for prohibiting autonomous denial in a wireless communication system is provided. A user equipment (UE) receives a configuration for autonomous denial over a first connection from a network, and prohibits the autonomous denial for UL transmission if the UL transmission corresponds to a specific signal.

6 Claims, 7 Drawing Sheets

(51) Int. Cl.
*H04B 1/10* (2006.01)
*H04W 24/08* (2009.01)

(56) References Cited

U.S. PATENT DOCUMENTS

2012/0250520 A1* 10/2012 Chen ................... H04L 5/001
                                              370/241
2012/0275362 A1* 11/2012 Park .................... H04W 74/02
                                              370/311

OTHER PUBLICATIONS

Motorola Mobility, "Restriction on Autonomous Denials," 3GPP TSG-RAN WG2 #78, R2-122708, Prague, Czech, May 21-25, 2012, see p. 1, line 29-p. 2, line 4.

\* cited by examiner

METHOD AND APPARATUS FOR PROHIBITING AUTONOMOUS DENIAL IN WIRELESS COMMUNICATION SYSTEM

This application is a 35 USC §371 National Stage entry of International Application No. PCT/KR2013/009841 filed on Nov. 1, 2013, and claims priority to U.S. Provisional Application No. 61/721,469 filed on Nov. 1, 2012, all of which are hereby incorporated by reference in their entireties as if fully set forth herein.

BACKGROUND OF THE INVENTION

Field of the Invention

The present invention relates to wireless communications, and more particularly, to a method and apparatus for prohibiting autonomous denial in a wireless communication system.

Related Art

Universal mobile telecommunications system (UMTS) is a $3^{rd}$ generation (3G) asynchronous mobile communication system operating in wideband code division multiple access (WCDMA) based on European systems, global system for mobile communications (GSM) and general packet radio services (GPRS). A long-term evolution (LTE) of UMTS is under discussion by the $3^{rd}$ generation partnership project (3GPP) that standardized UMTS.

In order to allow users to access various networks and services ubiquitously, an increasing number of user equipments (UEs) are equipped with multiple radio transceivers. For example, a UE may be equipped with LTE, Wi-Fi, Bluetooth (BT) transceivers, etc., for wireless communication systems, and global navigation satellite system (GNSS) receivers. For example, a UE may be equipped with a LTE module and a Bluetooth module in order to receive a voice over Internet (VoIP) services and multimedia services using a Bluetooth earphone. A UE may be equipped with a LTE module and a Wi-Fi module in order to distribute traffics. A UE may be equipped with a LTE module and a GNSS module in order to acquire location information additionally.

Due to extreme proximity of multiple radio transceivers within the same UE, the transmit power of one transmitter may be much higher than the received power level of another receiver. By means of filter technologies and sufficient frequency separation, the transmit signal may not result in significant interference. But for some coexistence scenarios, e.g., different radio technologies within the same UE operating on adjacent frequencies or sub-harmonic frequencies, the interference power coming from a transmitter of the collocated radio may be much higher than the actual received power level of the desired signal for a receiver. This situation causes in-device coexistence (IDC) interference. The challenge lies in avoiding or minimizing IDC interference between those collocated radio transceivers, as current state-of-the-art filter technology might not provide sufficient rejection for certain scenarios. Therefore, solving the interference problem by single generic radio frequency (RF) design may not always be possible and alternative methods needs to be considered.

To avoid the IDC interference, autonomous denial may be used. If it is expected that reception of important messages of coexisting radio modules is difficult due to transmission of one radio module, the UE may deny assigned UL transmission autonomously in a specific number configured by an eNodeB (eNB). Therefore, the coexisting radio module may receive important messages.

However, some UL transmissions, e.g., radio resource control (RRC) messages, are delay-sensitive. Thus, if the UE applies autonomous denial of UL LTE transmission, such UL transmission will be delayed.

Therefore, in some cases, a method for prohibiting autonomous denial may be required.

SUMMARY OF THE INVENTION

The present invention provides a method for prohibiting autonomous denial in a wireless communication system. The present invention provides a method for prohibiting autonomous denial for an uplink (UL) transmission corresponding to a specific signal. The present invention provides a selective long term evolution (LTE) autonomous denial for in-device coexistence (IDC).

In an aspect, a method for prohibiting, by a user equipment (UE), autonomous denial in a wireless communication system is provided. The method includes receiving a configuration for autonomous denial over a first connection from a network, applying the autonomous denial for a first uplink (UL) transmission over the first connection based on the received configuration if downlink (DL) transmission over a second connection collides with the first UL transmission, and prohibiting the autonomous denial for a second UL transmission over the first connection if the second UL transmission corresponds to a specific signal.

The specific signal may correspond to at least one of specific radio resource control (RRC) messages, a sounding reference signal, a random access preamble, a scheduling request which is triggered to carry a specific RRC message, media access control (MAC) control element, or radio link control (RLC)/packet data convergence protocol (PDCP) control information. The specific RRC messages may correspond to one of a measurement report triggering handover, an RRC connection reconfiguration complete message, an RRC connection re-establishment complete message, an RRC connection request, an RRC connection setup complete message, a multimedia broadcast/multicast service (MBMS) interest indication, an in-device coexistence (IDC) indication, or a power preference indication. The sounding reference signal may correspond an aperiodic sounding reference signal.

The first connection may be a connection with an evolved-UMTS terrestrial radio access network (E-UTRAN).

The second connection may be a connection with a system on industrial, scientific and medical (ISM) band.

In another aspect, a user equipment (UE) in a wireless communication system is provided. The UE includes a radio frequency (RF) unit for transmitting or receiving a radio signal, and a processor coupled to the RF unit, and configure to receive a configuration for autonomous denial over a first connection from a network, apply the autonomous denial for a first uplink (UL) transmission over the first connection based on the received configuration if downlink (DL) transmission over a second connection collides with the first UL transmission, and prohibit the autonomous denial for a second UL transmission over the first connection if the second UL transmission corresponds to a specific signal.

For some delay-sensitive UL transmission, autonomous denial may not be applied.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
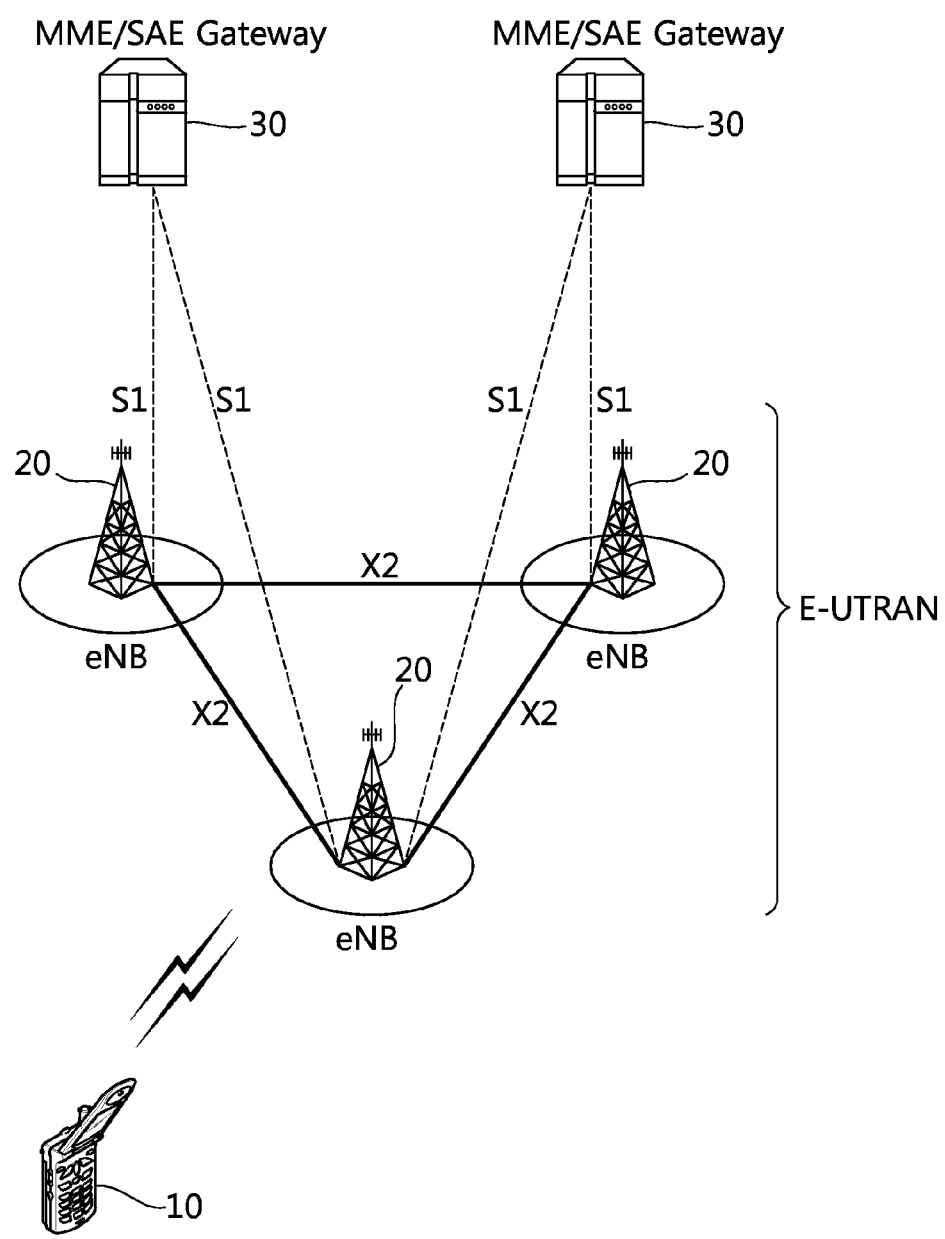
FIG. 1 shows LTE system architecture.

FIG. 1 shows LTE system architecture.

The LTE system architecture includes a user equipment (10), an evolved-UMTS terrestrial radio access network (E-UTRAN) and an evolved packet core (EPC). The UE 10 may be fixed or mobile, and may be referred to as another terminology, such as a mobile station (MS), a user terminal (UT), a subscriber station (SS), a wireless device, etc. The E-UTRAN includes a plurality of evolved node-Bs (eNBs) 20. The eNB 20 provides a control plane and a user plane to the UE 10. The eNB 20 is generally a fixed station that communicates with the UE 10 and may be referred to as another terminology, such as a base station (BS), a base transceiver system (BTS), an access point, etc. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

The EPC includes a mobility management entity (MME) which is in charge of control plane functions, and a serving gateway (S-GW) which is in charge of user plane functions. The EPC may further include a packet data network (PDN) gateway (PDN-GW). The MME has UE access information or UE capability information, and such information may be primarily used in UE mobility management. The S-GW is a gateway of which an endpoint is an E-UTRAN. The PDN-GW is a gateway of which an endpoint is a PDN.

Interfaces for transmitting user traffic or control traffic may be used. The UE 10 and the eNB 20 are connected by means of a Uu interface. The eNBs 20 are interconnected by means of an X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

Figure 2:
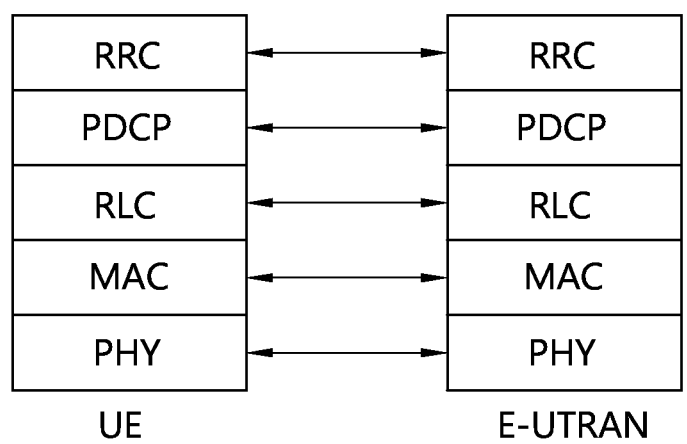
FIG. 2 shows a control plane of a radio interface protocol of an LTE system.
Figure 3:
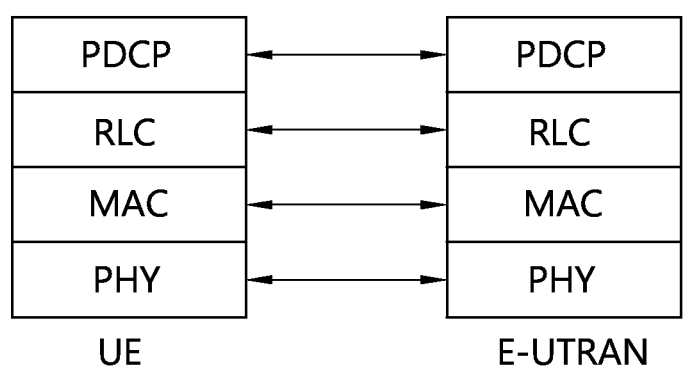
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides an upper layer with an information transfer service through a physical channel. The PHY layer is connected to a medium access control (MAC) layer, which is an upper layer of the PHY layer, through a transport channel. Data is transferred between the MAC layer and the PHY layer through the transport channel. The transport channel is classified into a common transport channel and a dedicated transport channel according to whether the channel is shared or not. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ ACK/NACK signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

Figure 4:
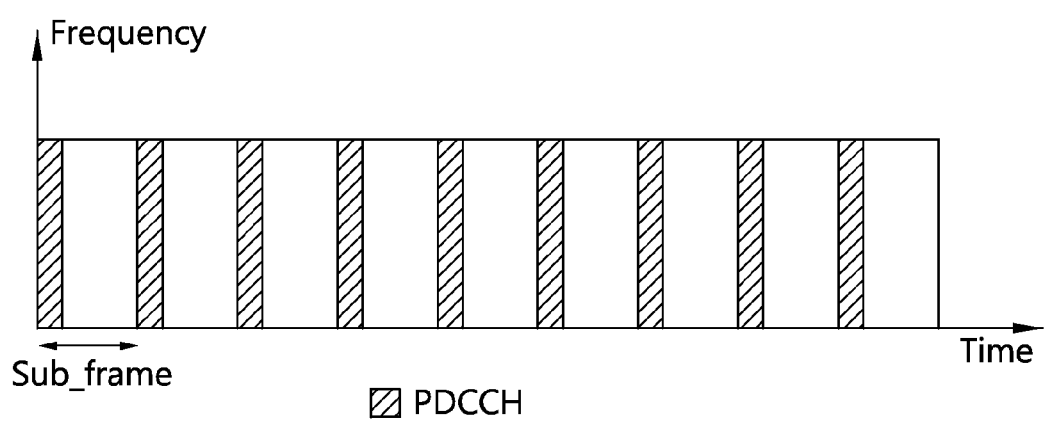
FIG. 4 shows an example of a physical channel structure.

FIG. 4 shows an example of a physical channel structure.

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. A transmission time interval (TTI) which is a unit time for data transmission may be equal to a length of one subframe.

A DL transport channel for transmitting data from the network to the UE includes a broadcast channel (BCH) for transmitting system information, a paging channel (PCH) for transmitting a paging message, a DL-SCH for transmitting user traffic or control signals, etc. The system information carries one or more system information blocks. All system information blocks may be transmitted with the same periodicity. Traffic or control signals of a multimedia broadcast/multicast service (MBMS) may be transmitted through the DL-SCH or a multicast channel (MCH). Meanwhile, a UL transport channel for transmitting data from the UE to the network includes a random access channel (RACH) for transmitting an initial control message, a UL-SCH for transmitting user traffic or control signals, etc.

A MAC layer belongs to the L2. The MAC layer provides a function of mapping multiple logical channels to multiple transport channels. The MAC layer also provides a function of logical channel multiplexing by mapping multiple logical channels to a single transport channel. The MAC layer is connected to a radio link control (RLC) layer, which is an upper layer of the MAC layer, through the logical channel. The logical channel is classified into a control channel for transmitting control plane information and a traffic channel for transmitting user plane information, according to a type of transmitted information.

The logical channel is located above the transport channel, and is mapped to the transport channel. The logical includes a broadcast control channel (BCCH), a paging control channel (PCCH), a common control channel (CCCH), a multicast control channel (MCCH), a multicast traffic channel (MTCH), etc.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression, which decreases a size of an Internet protocol (IP) packet header which contains relatively large-sized and unnecessary control information, to support effective transmission in a radio section having a narrow bandwidth, when IP packets, i.e., IPv4 or IPv6, transmitted. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belonging to the L3 is defined only in the control plane. The RRC layer takes a role of controlling a radio resource between the UE and the network. For this, the UE and the network exchange an RRC message through the RRC layer. The RRC layer serves to control the logical channel, the transport channel, and the physical channel in association with configuration, reconfiguration, and release of RBs. An RB is a logical path provided by the L1 and L2 for data delivery between the UE and the network. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

An RRC state indicates whether an RRC layer of the UE is logically connected to an RRC layer of the E-UTRAN. When an RRC connection is established between the RRC layer of the UE and the RRC layer of the E-UTRAN, the UE is in an RRC connected state (RRC_CONNECTED), and otherwise the UE is in an RRC idle state (RRC_IDLE). Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a core network (CN) manages the UE in unit of a tracking area (TA) which is a larger area than a cell. That is, only the existence of the UE in RRC_IDLE is recognized in unit of a large area, and the UE must transition to RRC_CONNECTED to receive a typical mobile communication service such as voice or data communication.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

Reception of an RRC connection reconfiguration (RRC-ConnectionReconfiguration) message including the mobilityControlInfo by the UE is described.

If the RRCConnectionReconfiguration message includes the mobilityControlInfo and the UE is able to comply with the configuration included in this message, the UE shall:

1> stop timer T310, if running;
1> start timer T304 with the timer value set to t304, as included in the mobilityControlInfo;
1> if the carrierFreq is included:
2> consider the target primary cell (PCell) to be one on the frequency indicated by the carrierFreq with a physical cell identity indicated by the targetPhysCellId;
1> else:
2> consider the target PCell to be one on the frequency of the source PCell with a physical cell identity indicated by the targetPhysCellId;
1> start synchronizing to the DL of the target PCell;
1> reset MAC;
1> re-establish PDCP for all RBs that are established;
1> re-establish RLC for all RBs that are established;
1> configure lower layers to consider the secondary cell(s) (SCell(s)), if configured, to be in deactivated state;
1> apply the value of the newUE-Identity as the cell radio network temporary identity (C-RNTI);
1> if the RRCConnectionReconfiguration message includes the fullConfig:
2> perform the radio configuration procedure;
1> configure lower layers in accordance with the received radioResourceConfigCommon;
1> configure lower layers in accordance with any additional fields, not covered in the previous, if included in the received mobilityControlInfo;
1> if the RRCConnectionReconfiguration message includes the radioResourceConfigDedicated:
2> perform the radio resource configuration procedure;
1> if the keyChangeIndicator received in the securityConfigHO is set to TRUE:
2> update the $K_{eNB}$ key based on the fresh $K_{ASME}$ key taken into use with the previous successful non-access stratum (NAS) security mode command (SMC) procedure;
1> else:
2> update the $K_{eNB}$ key based on the current $K_{eNB}$ or the NH, using the nextHopChainingCount value indicated in the securityConfigHO;
1> store the nextHopChainingCount value;
1> if the securityAlgorithmConfig is included in the securityConfigHO:
2> derive the $K_{RRCint}$ key associated with the integrityProtAlgorithm;
2> if connected as an relay node (RN):
3> derive the $K_{uPint}$ key associated with the integrityProtAlgorithm;
2> derive the $K_{RRCenc}$ key and the $K_{UPenc}$ key associated with the cipheringAlgorithm;
1> else:
2> derive the $K_{RRCint}$ key associated with the current integrity algorithm;
2> if connected as an RN:
3> derive the $K_{UPint}$ key associated with the current integrity algorithm;
2> derive the $K_{RRCenc}$ key and the $K_{UPenc}$ key associated with the current ciphering algorithm;
1> configure lower layers to apply the integrity protection algorithm and the $K_{RRCint}$ key, i.e. the integrity protection configuration shall be applied to all subsequent messages received and sent by the UE, including the message used to indicate the successful completion of the procedure;
1> configure lower layers to apply the ciphering algorithm, the $K_{RRCenc}$ key and the $K_{UPenc}$ key, i.e. the ciphering configuration shall be applied to all subsequent messages received and sent by the UE, including the message used to indicate the successful completion of the procedure;
1> if connected as an RN:
2> configure lower layers to apply the integrity protection algorithm and the $K_{UPint}$ key, for current or subsequently established DRBs that are configured to apply integrity protection, if any;
1> if the received RRCConnectionReconfiguration includes the sCellToReleaseList:
2> perform SCell release;
1> if the received RRCConnectionReconfiguration includes the sCellToAddModList:
2> perform SCell addition or modification;
1> perform the measurement related actions;
1> if the RRCConnectionReconfiguration message includes the measConfig:
2> perform the measurement configuration procedure;
1> perform the measurement identity autonomous removal;
1> release reportProximityConfig and clear any associated proximity status reporting timer;
1> if the RRCConnectionReconfiguration message includes the reportProximityConfig:
2> perform the proximity indication in accordance with the received reportProximityConfig;
1> release idc-Config, if configured (FFS);
1> if the RRCConnectionReconfiguration message includes the idc-Config:
2> perform the In-device coexistence indication procedure;
1> if the RRCConnectionReconfiguration message includes the powerPrefIndicationConfig:
2> perform the power preference indication procedure;
1> if the RRCConnectionReconfiguration message includes the obtainLocation:
2> attempt to have detailed location information available;
1> set the content of RRCConnectionReconfigurationComplete message as follows:
2> if the UE has radio link failure or handover failure information available in
VarRLF-Report and if the registered public land mobile network (RPLMN) is included in plmn-IdentityList stored in VarRLF-Report:
3> include rlf-InfoAvailable;
2> if the UE has logged measurements available for E-UTRA and if the RPLMN is included in plmn-IdentityList stored in VarLogMeasReport:
3> include the logMeasAvailable;
2> if the UE has connection establishment failure information available in VarConnEstFail-Report and if the RPLMN is equal to plmn-Identity stored in VarConnEstFail-Report:
3> include connEstFailInfoAvailable;
1> submit the RRCConnectionReconfigurationComplete message to lower layers for transmission;
1> if MAC successfully completes the random access procedure:
2> stop timer T304;
2> apply the parts of the channel quality indicator (CQI) reporting configuration, the scheduling request configuration and the sounding RS configuration that do not require the UE to know the single frequency network (SFN) of the target PCell, if any;
2> apply the parts of the measurement and the radio resource configuration that require the UE to know the SFN of the target PCell (e.g. measurement gaps, periodic CQI reporting, scheduling request configuration, sounding RS configuration), if any, upon acquiring the SFN of the target PCell;

2> the procedure ends;

Initiation of an RRC connection re-establishment is described.

The UE shall only initiate the procedure when AS security has been activated. The UE initiates the procedure when one of the following conditions is met:

1> upon detecting radio link failure; or
    1> upon handover failure; or
    1> upon mobility from E-UTRA failure; or
    1> upon integrity check failure indication from lower layers; or
    1> upon an RRC connection reconfiguration failure;

Upon initiation of the procedure, the UE shall:

1> stop timer T310, if running;
    1> start timer T311;
    1> suspend all RBs except SRB0;
    1> reset MAC;
    1> release the SCell(s), if configured;
    1> release the secondary TAG(s), if configured;
    1> apply the default physical channel configuration;
    1> apply the default semi-persistent scheduling configuration;
    1> apply the default MAC main configuration;
    1> release reportProximityConfig and clear any associated proximity status reporting timer;
    1> release idc-Config, if configured (FFS);
    1> release measSubframePatternPCell, if configured;
    1> if connected as an RN and configured with an RN subframe configuration:
        2> release the RN subframe configuration;
    1> perform cell selection in accordance with the cell selection process;

In-device coexistence (IDC) indication procedure is described. The purpose of the IDC indication procedure is to inform the E-UTRAN about (a change of) the IDC problems experienced by the UE in RRC_CONNECTED and to provide the E-UTRAN with information in order to resolve them.

Figure 5:
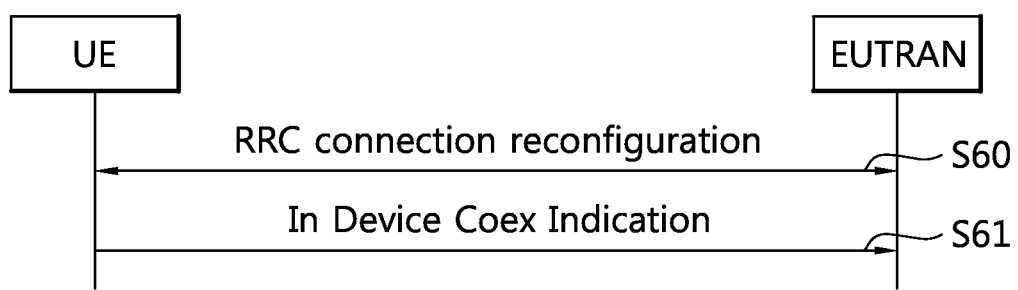
FIG. 5 shows an IDC indication procedure.

FIG. 5 shows an IDC indication procedure. At step S60, the UE and the E-UTRAN performs an RRC connection reconfiguration procedure. At step S51, the UE transmits an InDeviceCoexIndication message to the E-UTRAN on a DCCH.

A UE capable of providing IDC indications in RRC_CONNECTED may initiate the procedure in several cases including upon being configured to IDC indications and upon change of IDC problem information.

Upon initiating the procedure, a UE in RRC_CONNECTED shall:

1> if configured to provide IDC indications:
        2> if the UE did not transmit an IDC indication since it was configured to provide IDC indications:
            3> if on one or more frequencies for which a measObjectEUTRA is configured, the UE is experiencing ongoing IDC problems that it cannot solve by itself;
                4> initiate the transmission of the InDeviceCoexIndication message;
        2> else:
            3> if the set of frequencies for which a measObjectEUTRA is configured and on which the UE is experiencing ongoing IDC problems that it cannot solve by itself, has changed; or
            3> if for one or more of the frequencies in this set of frequencies, the interferenceDirection has changed; or
            3> if the time division multiplexing (TDM) assistance information has changed:
                4> initiate the transmission of the InDeviceCoexIndication message.

The UE shall set the contents of the InDeviceCoexIndication message as follows:

1> if there is at least one E-UTRA carrier frequency affected by the IDC problems:
        2> include the IE affectedCarrierFreqList with an entry for each affected E-UTRA carrier frequency for which a measurement object is configured;
        2> for each E-UTRA carrier frequency included in the the IE affectedCarrierFreqList, include interferenceDirection and set it accordingly;
        2> include time domain multiplexing (TDM) based assistance information:
            3> if the UE has discontinuous reception (DRX) related assistance information that could be used to resolve the IDC problems:
                4> include drx-CycleLength, drx-Offset and drx-ActiveTime;
            3> else if the UE has desired subframe reservation patterns related assistance information that could be used to resolve the IDC problems:
                4> include idc-SubframePatternList.

The UE shall submit the InDeviceCoexIndication message to lower layers for transmission.

Table 1 and Table 2 show an example of the InDeviceCoexIndication message. The InDeviceCoexIndication message is used to inform the E-UTRAN about IDC problems which cannot be solved by the UE itself, as well as to provide information that may assist E-UTRAN when resolving these problems.

TABLE 1

```
-- ASN1START
InDeviceCoexIndication-r11 ::= SEQUENCE {
  criticalExtensions CHOICE {
    c1 CHOICE {
      inDeviceCoexIndication-r11 InDeviceCoexIndication-r11-IEs,
      spare3 NULL, spare2 NULL, spare1 NULL
    },
    criticalExtensionsFuture SEQUENCE { }
  }
}
InDeviceCoexIndication-r11-IEs ::= SEQUENCE {
  affectedCarrierFreqList-r11 AffectedCarrierFreqList-r11 OPTIONAL,
  tdm-AssistanceInfo-r11 TDM-AssistanceInfo-r11 OPTIONAL,
  lateNonCriticalExtension OCTET STRING OPTIONAL,
  nonCriticalExtension SEQUENCE { } OPTIONAL
}
AffectedCarrierFreqList-r11 ::= SEQUENCE      (SIZE
(1..maxFreqIDC-r11))      OF      AffectedCarrierFreq-r11
AffectedCarrierFreq-r11 ::= SEQUENCE {
  carrierFreq-r11 MeasObjectId,
  interferenceDirection-r11 ENUMERATED {eutra, other, both, spare}
}
TDM-AssistanceInfo-r11 ::= CHOICE {
  drx-AssistanceInfo-r11 SEQUENCE {
    drx-CycleLength-r11 ENUMERATED {sf40, sf64, sf80, sf128, sf160, sf256, spare2, spare1},
    drx-Offset-r11 INTEGER (0..255) OPTIONAL,
    drx-ActiveTime-r11 ENUMERATED {sf20, sf30, sf40, sf60, sf80, sf100, spare2, spare1}
  },
  idc-SubframePatternList-r11 IDC-SubframePatternList-r11,
  ...
}
IDC-SubframePatternList-r11 ::=SEQUENCE (SIZE
(1..maxSubframePatternIDC-r11)) OF
```

TABLE 1-continued

```
IDC-SubframePattern-r11
IDC-SubframePattern-r11 ::= CHOICE {
  subframePatternFDD-r11 BIT STRING (SIZE (40)),
  subframePatternTDD-r11 CHOICE {
    subframeConfig0-r11 BIT STRING (SIZE (70)),
    subframeConfig1-5-r11 BIT STRING (SIZE (10)),
    subframeConfig6-r11 BIT STRING (SIZE (60))
  },
  ...
}
-- ASN1STOP
```

| InDeviceCoexIndication field descriptions |
|---|
| affectedCarrierFreqList |
| List of E-UTRA carrier frequencies affected by IDC problems. |
| drx-CycleLength |
| Indicates the desired DRX cycle length that the E-UTRAN is recommended to configure. Value in number of subframes. Value sf40 corresponds to 40 subframes, sf64 corresponds to 64 subframes and so on. |
| drx-Offset |
| Indicates the desired DRX starting offset that the E-UTRAN is recommended to configure. If drx-CycleLength-r11 is configured, the starting frame and subframe satisfy the relation [(SFN * 10) + subframe number] modulo (drx-CycleLength-r11) = drx-Offset-r11. |
| drx-ActiveTime |
| Indicates the desired active time that the E-UTRAN is recommended to configure. Value in number of subframes. Value sf20 corresponds to 20 subframe, sf30 corresponds to 30 subframes and so on. |

| InDeviceCoexIndication field descriptions |
|---|
| idc-SubframePatternList |
| A list of one or more subframe patterns indicating which HARQ process E-UTRAN is requested to abstain from using. Value 0 indicates that E-UTRAN is requested to abstain from using the subframe. The first/leftmost bit corresponds to the subframe #0 of the radio frame satisfying SFN mod x = 0, where x is the size of the bit string divided by 10. Note. |
| interferenceDirection |
| Indicates the direction of IDC interference. Value eutra indicates that only E-UTRA is victim of IDC interference; value other indicates that only another radio is victim of IDC interference; and value both indicates that both E-UTRA and another radio are victims of IDC interference. The other radio refers to either the ISM radio or GNSS. |

In addition, once configured by the network, the UE can autonomously deny LTE UL transmission in all phases to protect industrial, scientific and medical (ISM) in rare cases if other solutions cannot be used. Conversely, it is assumed that the UE also autonomously denies ISM transmission in order to ensure connectivity with the eNB to perform necessary LTE procedures, e.g., RRC connection reconfiguration and paging reception, etc. The network may configure a long-term denial rate by dedicated RRC signaling to limit the amount of LTE UL autonomous denials. Otherwise, the UE shall not perform any LTE UL autonomous denials.

Parameters for the autonomous denial are configured in OtherConfig information element (IE). The OtherConfig IE contains configuration related to other configuration. Table 3 and Table 4 show an example of the OtherConfig IE.

TABLE 3

```
-- ASN1START
OtherConfig-r9 ::= SEQUENCE {
  reportProximityConfig-r9 ReportProximityConfig-r9 OPTIONAL,   -- Need ON
  ...,
  [[ idc-Config-r11 IDC-Config-r11 OPTIONAL,   -- Need ON
     powerPrefIndicationConfig-r11 PowerPrefIndicationConfig-r11 OPTIONAL,   -- Need ON
     obtainLocationConfig-r11 ObtainLocationConfig-r11 OPTIONAL -- Need ON
  ]]
}
IDC-Config-r11 ::= SEQUENCE {
  idc-Indication-r11 ENUMERATED {setup} OPTIONAL, -- Need OR
  autonomousDenialParameters-r11 CHOICE {
    release NULL,
    setup SEQUENCE {
      autonomousDenialSubframes-r11 ENUMERATED {n2, n5, n10, n15, n20, n30, spare2, spare1},
      autonomousDenialValidity-r11 ENUMERATED {sf200, sf500, sf1000, sf2000,
                                                spare4, spare3, spare2, spare1}
    }
  },
  ...
}
ObtainLocationConfig-r11 ::= SEQUENCE {
  obtainLocation-r11 ENUMERATED {setup} OPTIONAL -- Need OR
}
PowerPrefIndicationConfig-r11 ::= SEQUENCE {
  powerPrefIndication-Enabled-r11 ENUMERATED {enabled} OPTIONAL, -- Need OR
  powerPrefIndication-Timer-r11 ENUMERATED {s0, s0dot5, s1, s2, s5, s10, s20,
    s30, s60, s90, s120, s300, s600, spare3, spare2, spare1} OPTIONAL  -- Cond ppiENABLED
}
ReportProximityConfig-r9 ::= SEQUENCE {
  proximityIndicationEUTRA-r9 ENUMERATED {enabled} OPTIONAL, -- Need OR
  proximityIndicationUTRA-r9 ENUMERATED {enabled} OPTIONAL -- Need OR
}
-- ASN1STOP
```

| OtherConfig field descriptions |
| --- |
| autonomousDenialSubframes |
| Indicates the maximum number of the assigned UL subframes for which the UE is allowed to deny the scheduled UL transmission. Value n2 corresponds to 2 subframes, n5 to 5 subframes and so on. |
| autonomousDenialValidity |
| Indicates the validity period over which the UL autonomous denial subframes shall be counted. Value sf200 corresponds to 200 subframes, sf500 corresponds to 500 subframes and so on. A moving window is used to count the validity of the UL autonomous denial, i.e. the UE can deny a particular UL subframe if over a duration of validity period from this subframe in the past, the autonomousDenialSubframes will not be exceeded. |
| idc-Indication |
| The field is used to indicate whether the UE is configured to initiate the transmission of InDeviceCoexIndication message to the network. |
| obtainLocation |
| Requests the UE to attempt to have detailed location information available using GNSS. E-UTRAN configures the field only if includeLocationInfo is configured for one or more measurements. |
| powerPrefIndication-Enabled |
| The field is used to indicate whether Power Preference Indication reporting from the UE is allowed or not. |
| powerPrefIndication-Timer |
| Prohibit timer for Power Preference Indication reporting. Value in seconds. Value s0 means prohibit timer is set to 0 second or not set, value s0dot5 means prohibit timer is set to 0.5 second, value s1 means prohibit timer is set to 1 second and so on. |
| reportProximityConfig |
| Indicates, for each of the applicable RATs (EUTRA, UTRA), whether or not proximity indication is enabled for CSG member cell(s) of the concerned RAT. Note. |

Some UL transmissions, e.g., RRC messages, are delay-sensitive. Thus, if the UE applies autonomous denial for UL LTE transmission, such UL transmission will be delayed. Accordingly, a method for prohibiting autonomous denial for a specific signal may be required.

Figure 6:
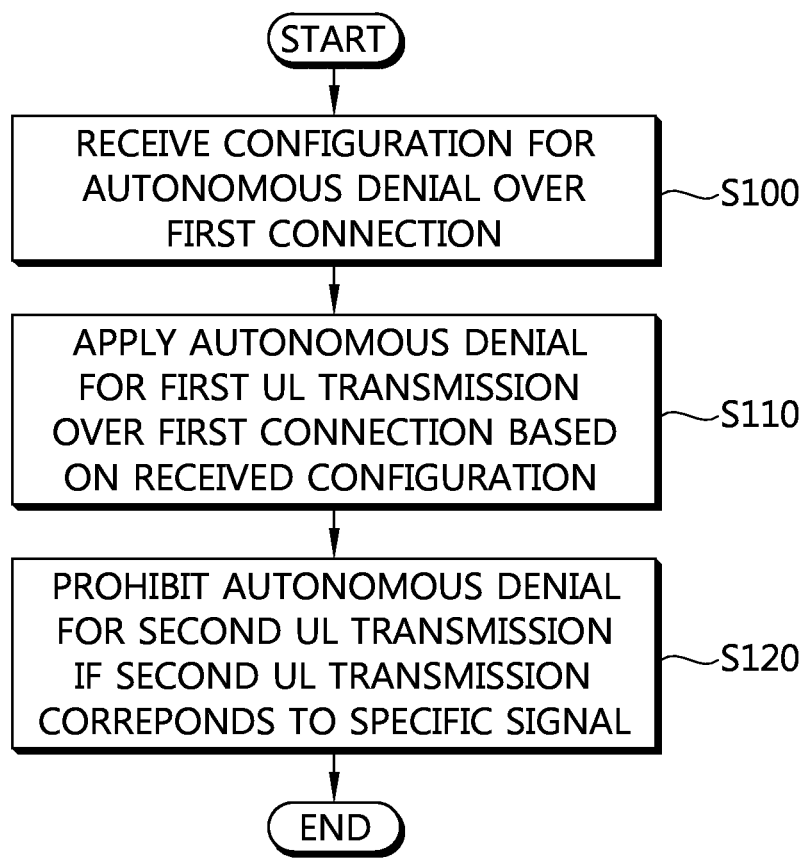
FIG. 6 shows an example of a method for prohibiting autonomous denial according to an embodiment of the present invention.

FIG. 6 shows an example of a method for prohibiting autonomous denial according to an embodiment of the present invention.

At step S100, the UE receives a configuration for autonomous denial over a first connection with a first system. At step S110, the UE applies the autonomous denial for a first UL transmission over the first connection based on the received configuration if DL transmission over a second connection with a second system collides with the first UL transmission. At step S120, the UE prohibits the autonomous denial for a second UL transmission over the first connection if the second UL transmission corresponds to a specific signal.

The first system may be an E-UTRAN, and the second system may be a system on ISM band such as Wi-Fi, Bluetooth, or global navigation satellite system (GNSS). The specific signal may be specific RRC messages such as a handover complete message, RRC connection re-establishment complete message, RRC connection request message. Or, the specific signal may be a periodic or aperiodic sounding reference signal. Or, the specific signal may be a random access preamble or a scheduling request which is triggered to carry a specific RRC message. Or, the specific signal may be a MAC control element or RLC/PDCP control information.

That is, the network configures IDC autonomous denial with autonomousDenialParameters for the UE via the RRC connection reconfiguration. Upon the configuration of IDC autonomous denial, the UE does not apply autonomous denial of either all RRC messages or only specific RRC messages as listed below.

- measurement report triggering handover: measurement reports sent due to event-triggered conditions, e.g., A3 event
- RRC connection reconfiguration complete (for handover complete)
- RRC connection re-establishment complete
- RRC connection request
- RRC connection setup complete
- MBMS interest indication
- IDC indication
- power preference indication Upon the configuration of IDC autonomous denial, the UE does not apply autonomous denial of a scheduling request or random access preamble which is triggered only to transmit a certain RRC message. The certain RRC message that prohibits autonomous denial can be any RRC message or a specific RRC message listed above. Or, upon the configuration of IDC autonomous denial, the UE does not apply autonomous denial of SRS transmission. The UE may apply autonomous denial of periodic SRS transmission, but the UE may prohibit autonomous denial of aperiodic SRS transmission. Or, upon the configuration of IDC autonomous denial, the UE does not apply autonomous denial of MAC control element or RLC/PDCP control information.

Figure 7:
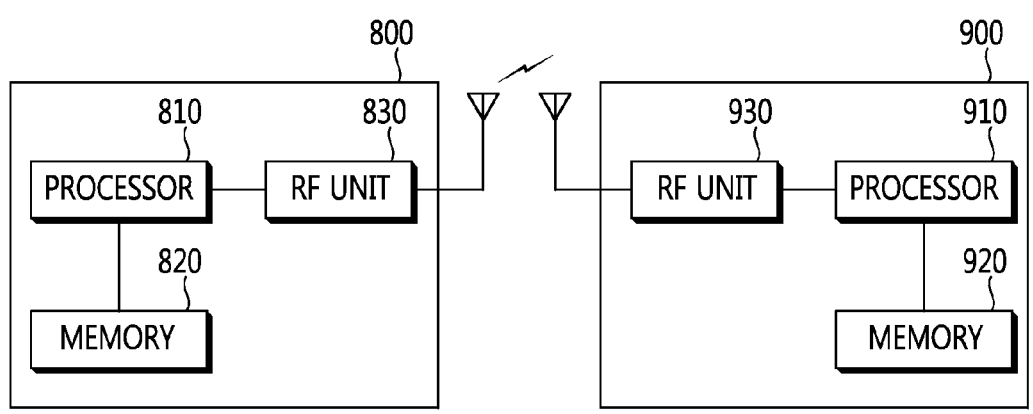
FIG. 7 is a block diagram showing wireless communication system to implement an embodiment of the present invention.

FIG. 7 is a block diagram showing wireless communication system to implement an embodiment of the present invention.

An eNB 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for prohibiting autonomous denial in a wireless communication system, the method performed by a user equipment (UE) and comprising:
    receiving a configuration for autonomous denial for a connection with an evolved-UMTS terrestrial radio access network (E-UTRAN);
    determining whether the autonomous denial is applied to an uplink transmission, wherein the uplink transmission is a transmission over the connection with E-UTRAN; and
    performing the uplink transmission using the configuration based on the determination,
    wherein if the uplink transmission collides with a downlink transmission over a connection with a system on an industrial, scientific and medical (ISM) band, and
        if the uplink transmission is a message for radio resource control (RRC) connection, the autonomous denial is not applied and the UE performs the uplink transmission,
        if the uplink transmission is not the message for RRC connection, the autonomous denial is applied and the UE does not perform the uplink transmission.

2. The method of claim 1, wherein the message for RRC connection corresponds to one of a measurement report triggering handover, an RRC connection reconfiguration complete message, an RRC connection re-establishment complete message, an RRC connection request, an RRC connection setup complete message, a multimedia broadcast/multicast service (MBMS) interest indication, an in-device coexistence (IDC) indication, or a power preference indication.

3. The method of claim 1, wherein the configuration includes a parameter for autonomous denial, and
    wherein the parameter is used for releasing the autonomous denial, or setup of the autonomous denial.

4. A user equipment (UE) in a wireless communication system, the UE comprising:
    a radio frequency (RF) unit that transmits or receiving receives a radio signal; and
    a processor, coupled to the RF unit, that:
    controls the RF unit to receive a configuration for autonomous denial for a connection with an evolved-UMTS terrestrial radio access network (E-UTRAN),
    determines whether the autonomous denial is applied to an uplink transmission, wherein the uplink transmission is a transmission over the connection with E-UTRAN, and
    performs the uplink transmission using the configuration based on the determination,
    wherein if the uplink transmission collides with a downlink transmission over a connection with a system on an industrial, scientific and medical (ISM) band, and
        if the uplink transmission is a message for radio resource control (RRC) connection, the autonomous denial is not applied and the UE performs the uplink transmission,
        if the uplink transmission is not the message for RRC connection, the autonomous denial is applied and the UE does not perform the uplink transmission.

5. The UE of claim 4, wherein the message for RRC connection corresponds to one of a measurement report triggering handover, an RRC connection reconfiguration complete message, an RRC connection re-establishment complete message, an RRC connection request, an RRC connection setup complete message, a multimedia broadcast/multicast service (MBMS) interest indication, an in-device coexistence (IDC) indication, or a power preference indication.

6. The UE of claim 4, wherein the configuration includes a parameter for autonomous denial, and
    wherein the parameter is used for releasing the autonomous denial, or setup of the autonomous denial.

* * * * *